US010726634B2

(12) United States Patent
Martinez Molina et al.

(10) Patent No.: US 10,726,634 B2
(45) Date of Patent: Jul. 28, 2020

(54) GENERATING AND PROVIDING PLATFORM AGNOSTIC SCENE FILES IN AN INTERMEDIATE FORMAT

(71) Applicant: MICROSOFT TECHNOLOGY LICENSING, LLC, Redmond, WA (US)

(72) Inventors: Harold Anthony Martinez Molina, Redmond, WA (US); Michael Lee Smith, Kirkland, WA (US); Andrew John Howe, Sammamish, WA (US); Vidya Srinivasan, Issaquah, WA (US); Justin Chung-Ting Lam, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 64 days.

(21) Appl. No.: 15/972,028

(22) Filed: May 4, 2018

(65) Prior Publication Data
US 2019/0340834 A1  Nov. 7, 2019

(51) Int. Cl.
*G06T 19/20* (2011.01)

(52) U.S. Cl.
CPC ...... *G06T 19/20* (2013.01); *G06T 2219/2008* (2013.01); *G06T 2219/2012* (2013.01); *G06T 2219/2016* (2013.01)

(58) Field of Classification Search
None
See application file for complete search history.

(56) References Cited

U.S. PATENT DOCUMENTS

| 5,995,102 A * | 11/1999 | Rosen | G06F 3/04812 |
| | | | 715/856 |
| 7,765,182 B2 * | 7/2010 | Peurach | G06F 3/016 |
| | | | 715/701 |
| 8,817,021 B1 * | 8/2014 | Hickman | G06F 16/56 |
| | | | 345/420 |
| 9,578,094 B1 | 2/2017 | Ranade | |

(Continued)

OTHER PUBLICATIONS

"Amazon Sumerian", Retrieved From https://aws.amazon.com/sumerian/, Retrieved on: Mar. 27, 2018, 13 Pages.

(Continued)

*Primary Examiner* — Andrew G Yang
(74) *Attorney, Agent, or Firm* — Newport IP, LLC; Jacob P. Rohwer

(57) ABSTRACT

The techniques described herein convert platform-specific scene files produced by multiple different design platforms into platform-agnostic scene files configured in an intermediate format. The intermediate format comprises a human-readable format that provides written descriptions of content in a three-dimensional scene template. The platform-agnostic scene files can be provided to any one of multiple different consumption platforms so the data in the intermediate format can be interpreted and a three-dimensional scene template can be rebuilt. Once rebuilt, the three-dimensional scene template provides a starting point for a user to create a three-dimensional scene for an experience (e.g., the user can continue to add content to create and customize a scene for a particular purpose).

11 Claims, 5 Drawing Sheets

(56) References Cited

U.S. PATENT DOCUMENTS

| | | | |
|---|---|---|---|
| 2005/0005263 A1* | 1/2005 | Miyazaki | G06F 17/2247 |
| | | | 717/114 |
| 2005/0212803 A1* | 9/2005 | Peachey | G06T 13/00 |
| | | | 345/473 |
| 2006/0015431 A1* | 1/2006 | Bugaj | G06Q 40/00 |
| | | | 705/35 |
| 2010/0332998 A1* | 12/2010 | Sun | G06F 3/04815 |
| | | | 715/757 |
| 2011/0098113 A1* | 4/2011 | Lanciault | G06T 13/20 |
| | | | 463/32 |
| 2012/0054873 A1* | 3/2012 | Hao | G06T 15/005 |
| | | | 726/26 |
| 2012/0229446 A1* | 9/2012 | Hyndman | G09B 5/06 |
| | | | 345/419 |
| 2013/0124153 A1 | 5/2013 | Balistrieri et al. | |
| 2014/0029849 A1* | 1/2014 | Sen | G06T 15/503 |
| | | | 382/167 |
| 2014/0176604 A1* | 6/2014 | Venkitaraman | G09G 5/377 |
| | | | 345/633 |
| 2015/0206447 A1* | 7/2015 | Vahid | G06F 3/0486 |
| | | | 434/362 |
| 2016/0358366 A1 | 12/2016 | Wang et al. | |
| 2017/0132831 A1* | 5/2017 | Von Beuningen | G06T 11/00 |

OTHER PUBLICATIONS

Colon, et al., "3D mission oriented simulation", Retrieved From https://www.researchgate.net/publication/238665812_3D_mission_oriented_simulation, Jan. 2008, 16 Pages.

Edwards, Jack, "A sprite-based video game engine and editor for creating component-based games", In CM2303 Final report of Cardiff University, May 5, 2017, 37 Pages.

Fornaris, Arian, "Assets Management", Retrieved From https://phasereditor2d.com/docs/assets-manager.html, Retrieved on: Mar. 27, 2018, 12 Pages.

Greene, Jacob W., "Introduction to Mobile Augmented Reality Development in Unity", Retrieved From https://programminghistorian.org/lessons/intro-to-augmented-reality-with-unity, Jul. 24, 2016, 65 Pages.

Sedlmayr, Steve, "Cross Platform VR/AR Development in Unity for Vive and HoloLens", Retrieved From http://elevr.com/cross-platform-vrar-development-in-unity-for-vive-and-hololens/#h.3ve0oanxwj4m, Oct. 7, 2016, 28 Pages.

Shiratuddin, et al., "Utilizing a 3d Game Engine to Develop a Virtual Design Review System", In Journal of Information Technology in Construction, vol. 16, Jan. 2011, pp. 39-68.

"A Concept for Database Oriented 3D Graphics Engine Infrastructure", Retrieved from https://www.graphicon.ru/html/2017/papers/pp28-31.pdf, Sep. 24, 2017, pp. 28-31.

"Introduction to USD—Universal Scene Description", Retrieved From: https://web.archive.org/web/20180429132819/https://graphics.pixar.com/usd/docs/index.html, Apr. 29, 2018, 4 Pages.

"International Search Report and Written Opinion Issued in PCT Application No. PCT/US2019/029509", dated Jul. 22, 2019, 11 Pages.

* cited by examiner

GENERATING AND PROVIDING PLATFORM AGNOSTIC SCENE FILES IN AN INTERMEDIATE FORMAT

BACKGROUND

As use of head-mounted display devices becomes more prevalent, an increasing number of users can participate in an experience in which content is displayed via augmented reality techniques, mixed reality techniques, and/or virtual reality techniques. Furthermore, more and more people are creating these three-dimensional experiences for a particular purpose (e.g., an employee training experience for new employee training, a marketing experience for potential purchasers of a service such as a vacation or an item such as a pair of skis, etc.).

There are multiple different design platforms that designers use to create a three-dimensional scene template. A three-dimensional scene template can include a background and/or three-dimensional object(s). Each of these design platforms produces, as an output, files in a platform-specific format (may be referred to herein as platform-specific scene files). Furthermore, there are multiple different consumption platforms that enable consumers to use the previously designed three-dimensional scene template as a starting point to create their own three-dimensional scenes. Consequently, an individual consumption platform must be configured to accept, as an input, platform-specific scene files from multiple different design platforms in order to rebuild three-dimensional scene templates. Moreover, an individual platform-specific scene file must be converted multiple times in order to respectively rebuild the three-dimensional scene template in multiple different consumption platforms. An excessive amount of resources (e.g., time, computing resources, etc.) are required or consumed in order for a consumption platform to be configured to accept platform-specific scene files in various formats and in order for a platform-specific scene file to be converted multiple times in order to respectively rebuild the three-dimensional scene template in multiple different consumption platforms.

Even further, a designer often designs, using a design platform, a three-dimensional scene template for a specific consumption platform. This makes it difficult for the three-dimensional scene to be used across multiple different consumption platforms. Rather, to have the three-dimensional scene used in a different consumption platform than the one for which the three-dimensional scene template was designed, the designer would need to re-design the three-dimensional scene template using the same design platform or a different design platform.

SUMMARY

The disclosed techniques provide mechanisms to improve the way in which platform-specific scene file(s) that model a three-dimensional scene template can be used by various consumption platforms. As described herein, platform-specific scene files produced by multiple different design platforms are converted into platform-agnostic scene files configured in an intermediate format. Then, the platform-agnostic scene files can be provided to any one of multiple different consumption platforms so the data in the intermediate format can be interpreted and a three-dimensional scene template can be rebuilt. Once rebuilt, the three-dimensional scene template provides a starting point for a user to create a three-dimensional scene for an experience (e.g., the user can continue to add content to create and customize a scene for a particular purpose).

An exporter can be written to convert a platform-specific scene file, data of which is in a platform-specific format, to a platform-agnostic scene file that includes data in an intermediate format. The intermediate format comprises a human-readable format that provides written descriptions of content in a three-dimensional scene template. For example, the content can include various objects (e.g., three-dimensional objects). An individual object can be associated with attributes that are useable to rebuild the three-dimensional scene template. Moreover, an importer can be written for a consumption platform to take the platform-agnostic scene file as input and rebuild the three-dimensional scene template. The importer is configured to interpret the human-readable instructions so that various content (e.g., a three-dimensional object) can be rebuilt, or rendered for display in a manner that is the same or similar to the way in which the content was originally designed using the design platform.

After converting differently formatted data of platform-specific scene files from various design platforms into platform-agnostic scene files, the platform-agnostic scene files can be stored in a library so they can be accessed by any one of multiple different consumption platforms. Consequently, the techniques described herein provide an efficient and effective way of enabling a three-dimensional scene template, designed using a particular design platform, to be used across a plurality of different consumption platforms.

As described, a designer may provide settings for attributes of an object when designing a three-dimensional scene template. Example attributes of an object include, but are not limited to: a position of the object in the three-dimensional scene template, an orientation of the object in the three-dimensional scene template, a scale (e.g., a size) of the object in the three-dimensional scene template, a color of the object in the three-dimensional scene template, a shadowing of the object in the three-dimensional scene template, whether the object is configured for user interaction in the three-dimensional scene template, and so forth.

In various examples, a platform-agnostic scene file comprises a first section that lists or outlines (e.g., declares) different content in the three-dimensional scene template. For example, the first section can list and/or name various objects included in the three-dimensional scene template. In some implementations, an object listed in the first section may be associated with a uniform resource locator that provides access to data used to render the object (e.g., the object may have already been designed and made available by a third-party designer). The platform-agnostic scene file also comprises a second section that defines settings for the attributes useable to rebuild an individual object in the three-dimensional scene template. Thus, the settings can be configured based on user input to define a position of the object in the three-dimensional scene template (e.g., coordinates), an orientation of the object in the three-dimensional scene template, a scale (e.g., a size) of the object in the three-dimensional scene template, a color of the object in the three-dimensional scene template, a shadowing of the object in the three-dimensional scene template, whether the object is configured for user interaction in the three-dimensional scene template, and so forth.

A user may employ a consumption platform to create an experience. An experience can include two-dimensional scenes and/or three-dimensional scenes. The techniques described herein can be used to provide a starting point for three-dimensional scene creation, by importing a three-dimensional scene template to a consumption platform.

Generally, an experience includes related and/or linked content that can be accessed and/or displayed for a particular purpose. As a specific example, an experience can include company content an employer wants a new employee to know, to be informed about, or to learn, and thus, the new employee can access the experience, from a network location, when he or she starts a new job. In various examples, an experience can include one or more spaces. A space comprises a segment or type of content within the broader experience. Continuing the example from above and to further illustrate, one space can include company content that relates to job training for a new employee, while another space in the same experience can include company content related to different interest and activity groups for which the employer provides a budget (e.g., a hiking group, a skiing group, a chess group, a religious study group, etc.). This example shows how the two types of content relate to a situation where a new employee is beginning employment with a company, yet the types of content are different and therefore different spaces can be part of a broader experience.

In various implementations, the experience can be accessed by a Web browser or an application, executing on a computing device, via one or more network locations (e.g., a Web page, an Intranet page, etc.). A head-mounted display device can be tethered to a computing device. Aspects of the experience can include, for example, one or more virtual reality (VR) three-dimensional scenes, one or more augmented reality (AR) three-dimensional scenes, and/or one or more mixed reality (MR) three-dimensional scenes. In one example, each three-dimensional scene can be associated with a uniform resource locator (URL) of a Web page. In alternative implementations, the experience can be accessed by a Web browser to an application, executing on a head-mounted display device, via one or more network locations.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical elements.

DETAILED DESCRIPTION

The techniques described herein convert platform-specific scene files produced by multiple different design platforms into platform-agnostic scene files configured in an intermediate format. The intermediate format comprises a human-readable format that provides written descriptions of content in a three-dimensional scene template. The platform-agnostic scene files can be provided to any one of multiple different consumption platforms so the data in the intermediate format can be interpreted and a three-dimensional scene template can be rebuilt. Once rebuilt, the three-dimensional scene template provides a starting point for a user to create a three-dimensional scene for an experience (e.g., the user can continue to add content to create and customize a scene for a particular purpose).

An exporter can be written to convert a platform-specific scene file, data of which is in a platform-specific format, to a platform-agnostic scene file that includes data in the intermediate format. Moreover, an importer can be written for a consumption platform to take the platform-agnostic scene file as input and rebuild the three-dimensional scene template. The importer is configured to interpret the human-readable instructions so that various content (e.g., a three-dimensional object) can be rebuilt, or rendered for display in a manner that is the same or similar to the way in which the content was originally designed using the design platform.

Consequently, the techniques described herein provide an efficient and effective way of enabling a three-dimensional scene template, designed using a particular design platform, to be used across a plurality of different consumption platforms.

Various examples, scenarios, and aspects are described below with reference to FIGS. 1-5.

Figure 1:
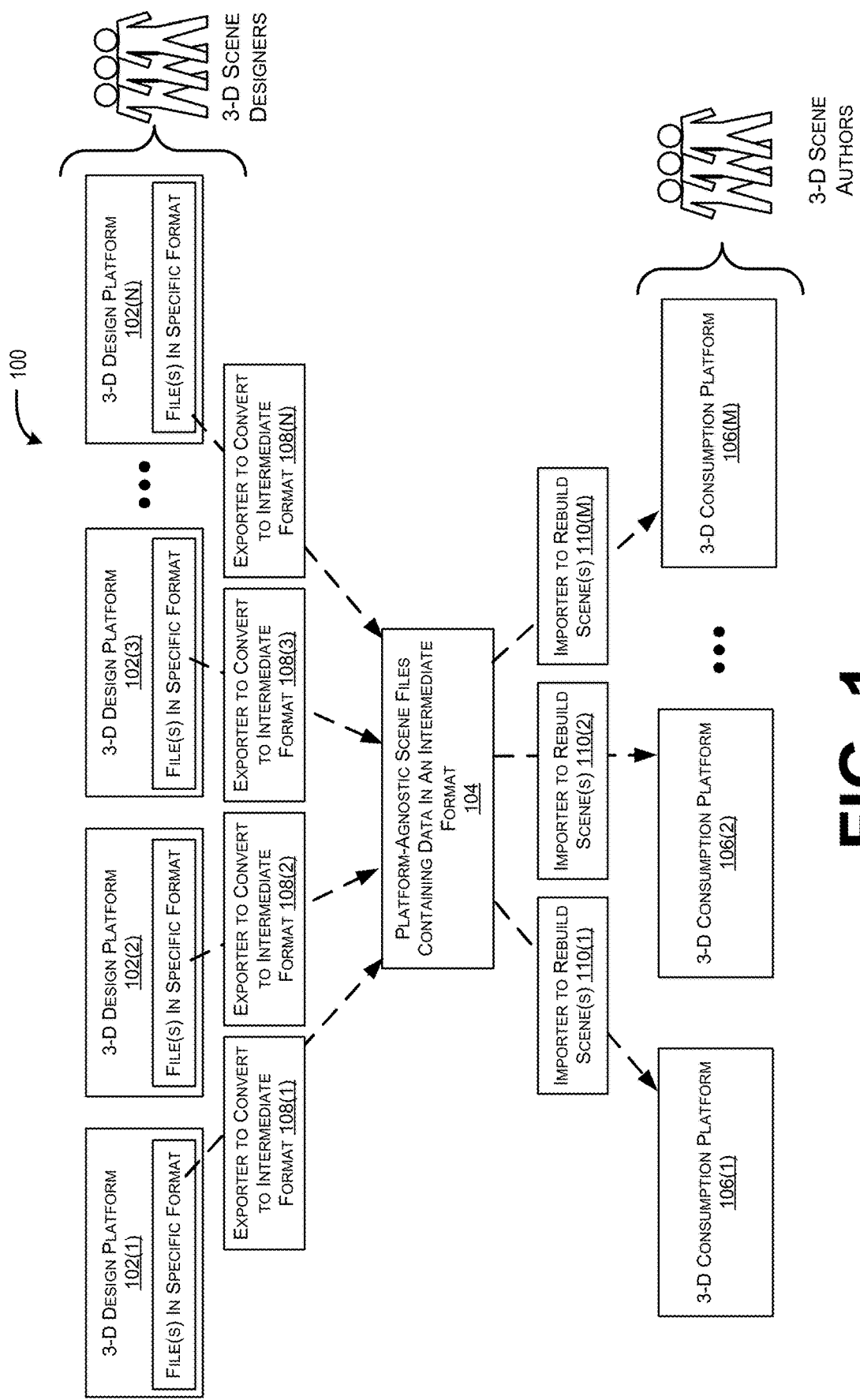
FIG. 1 is a diagram illustrating how platform-specific scene files from multiple different three-dimensional design platforms can be converted into platform-agnostic scene files that can then be provided to multiple different three-dimensional consumption platforms.

FIG. 1 is a diagram 100 illustrating how platform-specific scene files from multiple different three-dimensional design platforms 102(1) through 102(N) (where N is a positive integer number such as two, three, four, five, and so forth) can be converted into platform-agnostic scene files 104 that can then be provided to multiple different three-dimensional consumption platforms 106(1) through 106(M) (where M is a positive integer number such as two, three, four, five, and so forth). As described above, there are existing design platforms 102(1) through 102(N) that enable three-dimensional scene designers to design a three-dimensional scene template. A three-dimensional scene template can be designed so it can be used by a three-dimensional scene author via a three-dimensional consumption platform (e.g., one of three-dimensional consumption platforms 106(1) through 106(M)).

A platform-agnostic scene file 104 includes data in an intermediate format, which is a human-readable format that provides written descriptions of content in a three-dimensional scene template. Since each of the three-dimensional design platforms 102(1) through 102(N) produces scene files in a platform-specific format ("platform-specific scene files"), exporters 108(1) through 108(N) are written for the respective three-dimensional design platforms 102(1) through 102(N). The exporters 108(1) through 108(N) comprise a program to convert data in a platform-specific format into the intermediate format. Moreover, since each of the three-dimensional consumption platforms 106(1) through 106(M) execute different code to rebuild a three-dimensional scene template, importers 110(1) through 110(M) are written for the respective three-dimensional consumption platforms 106(1) through 106(M). An importer is configured to interpret the human-readable instructions in a platform-agnostic scene file so the content of the three-dimensional scene template can be rebuilt (e.g., a three-dimensional object can be rendered and displayed in the same or similar manner that it was designed).

To rebuild an object in a three-dimensional scene template, an importer is configured to interpret the written description of object attributes and map the written description to a platform-specific syntax that can be used to render and display the object. Example attributes of an object include, but are not limited to: a position of the object in the three-dimensional scene template, an orientation of the object in the three-dimensional scene template, a scale (e.g., a size) of the object in the three-dimensional scene template, a color of the object in the three-dimensional scene template, a shadowing of the object in the three-dimensional scene template, whether the object is configured for user interaction in the three-dimensional scene template, and so forth.

Consequently, the techniques described herein provide an efficient and effective way of enabling a three-dimensional scene template, designed using a particular design platform, to be used across a plurality of different consumption platforms. By implementing the techniques described herein, a designer does not have to re-design a three-dimensional scene template (i) so it can be used in a different three-dimensional consumption platform or (ii) when the three-dimensional design platform in which the three-dimensional scene template was originally designed is no longer available on the market or has fallen out of favor with various consumption platforms.

Figure 2:
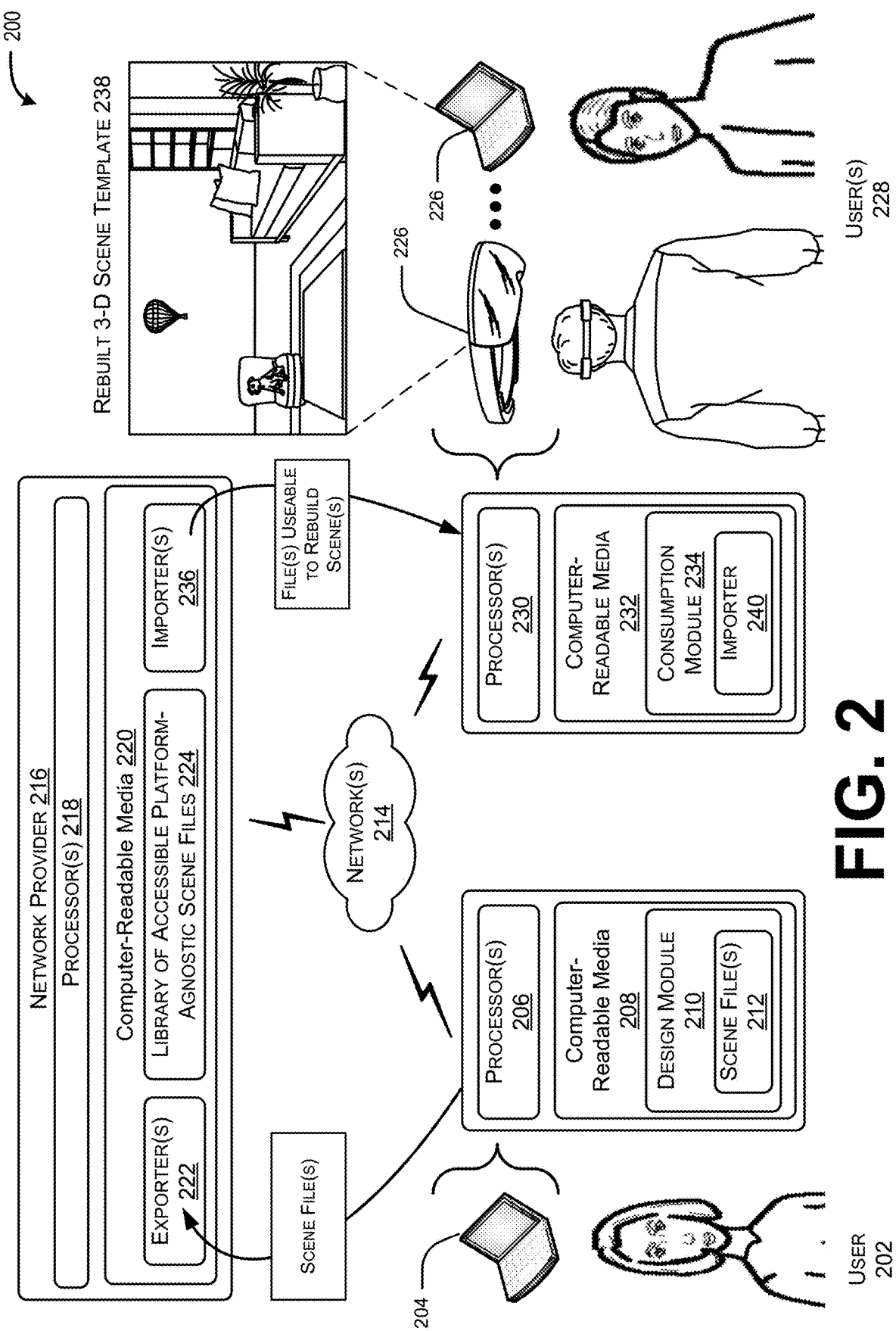
FIG. 2 is a diagram that illustrates an example of how a network system (e.g., network devices such as a server) and network communications can be used to implement the techniques described herein.

FIG. 2 is a diagram 200 that illustrates an example of how a network system (e.g., network devices such as a server) and network communications can be used to implement the techniques described herein. FIG. 2 illustrates that a first user 202 (e.g., a designer) uses a computing device 204 to design a three-dimensional scene template. The computing device 204 includes processor(s) 206 and computer-readable media 208. The computing device 108 may execute a design module 210. The design module 210 may be an application associated with one of the three-dimensional design platforms 102(1) through 102(N) in FIG. 1. In various examples, the design module 210 can comprise an application installed on the computing device and/or a component (e.g., a Web browser) configured to access a Web-enabled application.

In accordance with the design of a three-dimensional scene template, the design module 210 generates scene file(s) 212 in a platform-specific format. As shown in FIG. 2, these scene files are sent, over network(s) 214, to device(s) of a network provider 216 (e.g. a service and/or content provider). A device of a network provider 216 also includes processor(s) 218 and computer-readable media 220. The computer-readable media 220 comprises an exporter 222. The exporter 222 is a program written to convert scene files generated in the platform-specific format corresponding to the design module 210 into a platform-agnostic scene file that includes data in an intermediate format. Again, the intermediate format comprises human-readable instructions such as written descriptions of object attributes that can be used to rebuild the three-dimensional scene template in a disparate platform (e.g., one of the consumption platforms 106(1) through 106(M) from FIG. 1).

In various examples, the network provider 216 can store the platform-agnostic scene file in a library 224 that is accessible to various different consumption platforms, such as those illustrated in FIG. 1. Then, the network provider 216 receives a request to rebuild a three-dimensional scene template from a computing device 226 of another user 228. This user 228 can be an author of a three-dimensional scene that wants to use a three-dimensional scene template as a starting point. Computing device 226 also includes processor(s) 230 and computer-readable media 232. The computing device 226 may execute a consumption module 234. The consumption module 234 may be an application associated with one of the three-dimensional consumption platforms 106(1) through 106(M) in FIG. 1. In various examples, the consumption module 234 can comprise an application installed on the computing device 226 and/or a component (e.g., a Web browser) configured to access a Web-enabled application.

When the network provider 216 receives the request to rebuild a three-dimensional scene template using the consumption module 234, the network provider 216 can identify the corresponding platform-agnostic scene files in the library 224 and provide them to an importer 236. As described above, the importer 236 is a program written for the consumption module 234 so that the written descriptions of the object attributes can be interpreted and mapped to a platform-specific syntax that can be used to render and display the object in a rebuilt three-dimensional scene template 238. In various implementations, an importer 240 can be used on the client-side computing device 226.

The network provider 216 can execute different exporters and different importers that have been written for different design platforms and different consumption platforms. Consequently, the techniques described herein provide an efficient and effective way of enabling a three-dimensional scene template, designed using any one of multiple different design platforms, to be used across a plurality of different consumption platforms.

A computing device, such as computing devices 204 and 226, can include, but is not limited to: a game console, a desktop computer, a laptop computer, a gaming device, a tablet computer, a head-mounted display device, a personal data assistant (PDA), a mobile phone/tablet hybrid, a telecommunication device, a network-enabled television, a terminal, an Internet of Things (IoT) device, a work station, a media player, or any other sort of computing device. In some implementations, the computing device includes input/output (I/O) interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display screen, a printer, audio speakers, a haptic output device, and the like).

Network(s), such as network(s) 214, can include, for example, public networks such as the Internet, private networks such as an institutional and/or personal intranet, or some combination of private and public networks. Network(s) can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) can utilize communications protocols, including packet-based and/or datagram-based protocols such as internet protocol (IP), transmission control protocol (TCP), user datagram protocol (UDP), or other types of protocols. Moreover, network(s) can also include a number of devices that facilitate network communications and/or form a hardware basis for the networks, such as switches, routers, gateways, access points, firewalls, base stations, repeaters, backbone devices, and the like.

Examples of a head-mounted display device that can be used to consume a three-dimensional template include, but are not limited to: OCCULUS RIFT, GOOGLE DAYDREAM VIEW, MICROSOFT HOLOLENS, HTC VIVE, SONY PLAYSTATION VR, SAMSUNG GEAR VR, GOOGLE CARDBOARD, SAMSUNG HMD ODYSSEY, DELL VISOR, HP HEADSET, LENOVO EXPLORER, ACER HEADSET, or any augmented reality, mixed reality, and/or virtual reality devices.

In some instances, the head-mounted display device may not include a processor or computer-readable media. Rather, the head-mounted display device may comprise an output device configured to render data stored on another computing device for display. For instance, the head-mounted display device may be tethered to the computing device. Therefore, the interfaces of the computing device and the head-mounted display device can be configured to communicate via a wired and/or wireless Universal Serial Bus ("USB") connection, a High-Definition Multimedia Interface ("HDMI") connection, a BLUETOOTH connection, and so forth As used herein, a "processor" can represent, for example, a CPU-type processing unit, a GPU-type processing unit including a virtual GPU (VGPU), a field-programmable gate array (FPGA), a digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

As used herein, "computer-readable media" can store instructions executable by a processor and/or data (e.g., model data for a scene, a template, or an object). Computer-readable media can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of memory included in a device and/or a hardware component that is part of a device or external to a device, including but not limited to random-access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

The module(s) provided in FIG. 1 is an example, and the number of modules used to implement the techniques described herein can vary higher or lower. That is, functionality described herein in association with the illustrated modules can be performed by a fewer number of modules or a larger number of modules on one device or spread across multiple devices.

The network provider 216 can comprise a system that includes server computers, desktop computers, web-server computers, personal computers, mobile computers, laptop computers, tablet computers, or any other sort of computing device.

Figure 3:
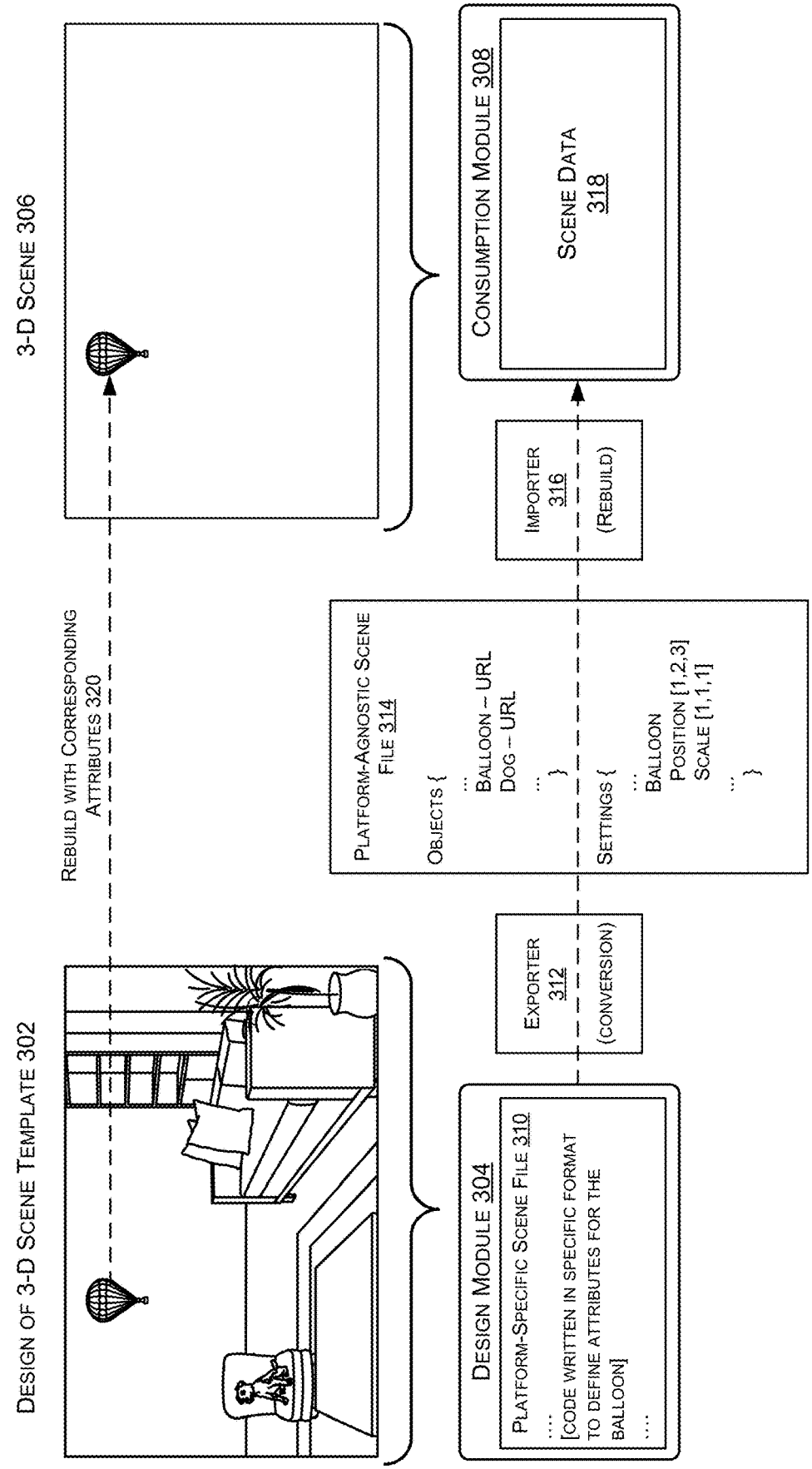
FIG. 3 is a diagram illustrating how an object configured as part of a designed three-dimensional scene template using a design platform is rebuilt in a three-dimensional scene using a consumption platform.

FIG. 3 is a diagram 300 illustrating how an object configured as part of a designed three-dimensional scene template 302 using a design platform (e.g., design module 304) is rebuilt in a three-dimensional scene 306 using a consumption platform (e.g., a consumption module 308). As shown, the three-dimensional scene template 302 designed by a designer includes a living room with a couch, a chair, a coffee table, a book case, a plant, a dog, and a balloon. These are examples of various content (e.g., objects) included in the three-dimensional scene template 302. On the consumption side, an author of the three-dimensional scene 306 may want to use the already designed three-dimensional scene template 302 as a starting point for scene creation, and thus, the three-dimensional scene template 302 needs to be rebuilt via the consumption platform 308 so the author can add new objects to create his or her own three-dimensional scene.

As described above, the design of the three-dimensional scene template 302 produces one or more platform-specific scene files 310 with data in a platform-specific format. For instance, the platform-specific format may define the design attributes of the balloon. The platform-specific scene files 310 are received (e.g., by a network provider) and passed to an exporter 312 so that the data in the platform-specific format can be converted to one or more platform-agnostic scene files 314 that includes data in an intermediate format. As illustrated, the intermediate format includes a human-readable format with written descriptions/instructions.

In various examples, a platform-agnostic scene file 314 comprises a first section that lists or outlines different content in the three-dimensional scene template 302. For instance, the first section can list and/or name various objects included in the three-dimensional scene template. In some implementations, an object listed in the first section may be associated with a uniform resource locator (URL) that provides access to data used to render the object (e.g., the object may have already been designed and made available by a third-party designer). As shown in FIG. 3, the first section of the platform-agnostic scene file 314 lists a URL where data for the balloon can be retrieved from and a URL where data for the dog can be retrieved from.

The platform-agnostic scene file 314 also comprises a second section that defines settings for the attributes useable to rebuild an individual object in the three-dimensional scene template 302. Thus, the settings can be configured based on design input to define various attributes. The second section of platform-agnostic scene file 314 provides a written description of a position and a scale of the balloon. Other attributes for which settings can be defined include an orientation of the object in the three-dimensional scene template, a color of the object in the three-dimensional scene template, a shadowing of the object in the three-dimensional scene template, whether the object is configured for user interaction in the three-dimensional scene template, etc.

Based on a request to consume the three-dimensional scene template 302, the platform-agnostic scene file 314 can be provided to an importer 316 so the written descriptions can be interpreted to produce scene data 318. As shown in FIG. 3, the scene data 318 is used to rebuild the balloon with corresponding attributes 320 so that it is graphically represented in the same or similar manner in which it was graphically represented in the design of the three-dimensional scene template 302.

The intermediate format is an extensible format. For example, the intermediate format is configured to adapt to new content that is designed or added to a three-dimensional scene template.

Figure 4:
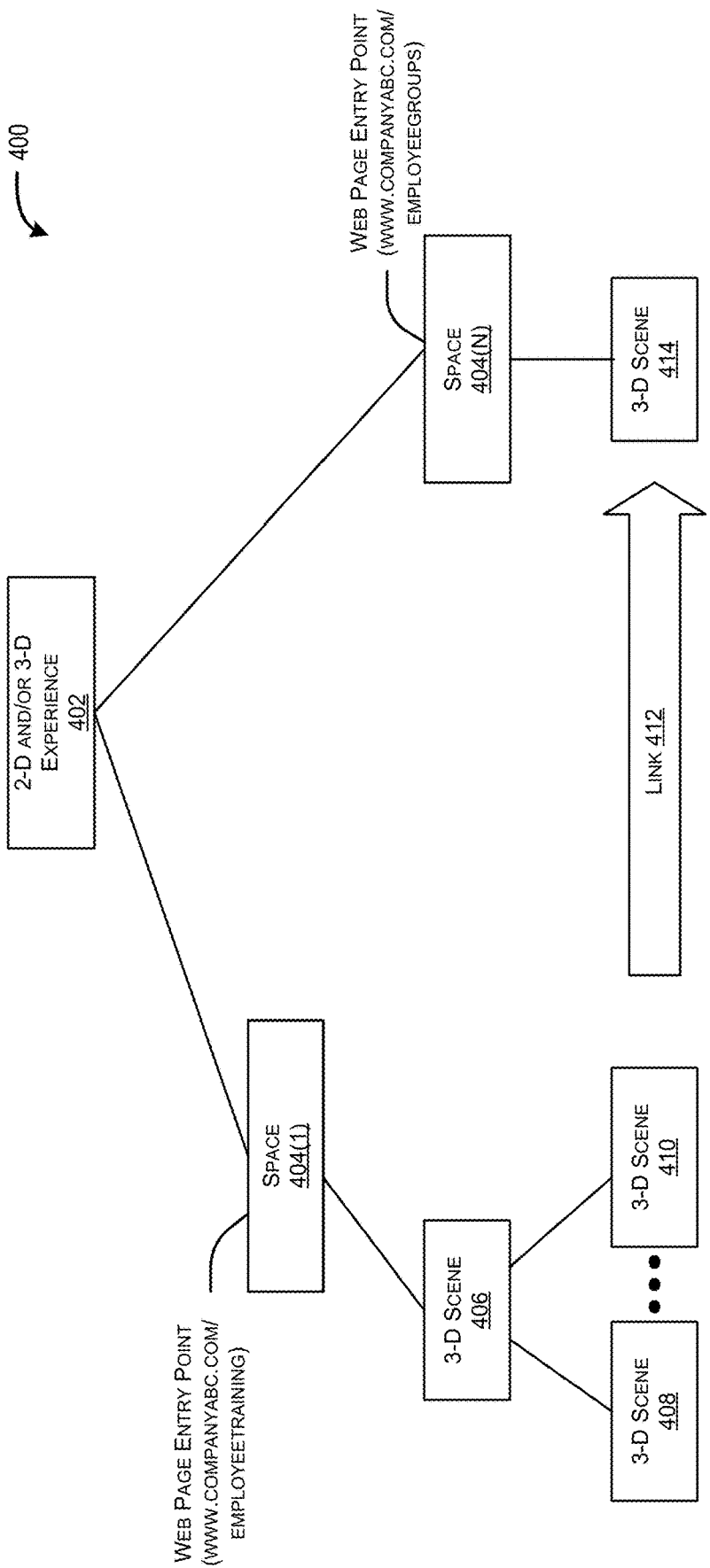
FIG. 4 is a diagram illustrating an example experience, of which three-dimensional scene(s) being consumed by a user can be a part.

FIG. 4 is a diagram 400 illustrating an example experience 402, of which a three-dimensional scene template being consumed by a user can be a part (e.g., the user can be an author creating a three-dimensional scene for an experience). As shown, the experience 402 can include two-dimensional scenes and/or three-dimensional scenes. Generally, an experience 402 includes related and/or linked content that can be accessed and/or displayed for a particular purpose. As a specific example, the experience 402 can include company content an employer wants a new employee to know, to be informed about, or to learn, and thus, the new employee can access the experience 402 when he or she starts a new job. In another specific example, the experience 402 can include lesson content a school teacher wants a student to know, to be informed about, or to learn, and thus, the student can access the experience when he or she dives into a particular lesson.

An experience 402 can include one or more spaces 404(1) through 404(N) (where N is a positive integer number such as one, two, three, four, and so forth). A space comprises a segment or type of content within the broader experience 402. There is no limitation how one segment or type of content can be distinguished from another segment or type of content in the same experience 402. Moreover, an experience may only include a single space. Continuing an example from above and to further illustrate, space 404(1) can include company content that relates to job training for a new employee, while space 404(N) can include company content related to different interest and activity groups for which the employer provides a budget (e.g., a hiking group, a skiing group, a chess group, a religious study group, etc.). The employer may have a policy to inform a new employee about these interest and activity groups when he or she starts a new job, so the new employee can join if a common interest is shared. This example shows how the two types of content relate to a situation where a new employee is beginning employment with a company, yet the types of content are different and therefore different spaces can be created and/or consumed within a broader experience 402.

As described above, a space can include three-dimensional scenes. In various implementations, an entry point for a user to consume a space can comprise a Web page or an Intranet page (e.g., a URL), initially accessed via the computing device. For instance, a new employee can visit "www.companyABC.com/employeetraining" on his or her computing device to enter space 404(1) that is part of the broader experience 402. The new employee can also visit "www.companyABC.com/employeegroups" on his or her computing device to enter space 404(N) that is part of the broader experience 402. In a specific example, space 404(1) may include a home page that displays two-dimensional content (e.g. text and a few images). This home page may include a first link to three-dimensional scene 406, which may contain links to three-dimensional scene 408 and three-dimensional scene 410. The three-dimensional scenes 406, 408, and 410 may also include links, or anchor points, that enable navigation to one another in a three-dimensional immersive environment. The new employee can consume the three-dimensional scenes 406, 408, and 410 in a three-dimensional immersive environment using a head-mounted display device connected to a computing device. These three-dimensional scenes 406, 408, and 410 can also comprise URLs that are part of the Web page (e.g., "www.companyABC.com/employeetraining/3Dscene408" and "www-.companyABC.com/employeetraining/3Dscene410").

Moreover, a scene 410 in a first space 404(1) can provide a link 412 (e.g., via the selection of a three-dimensional object) to a three-dimensional scene 414 in a second space 404(N).

Accordingly, the consumption of three-dimensional scenes, as described herein, can be implemented as part of an experience 402 created for a particular type of user (e.g., a new employee, a student of a class, etc.). In various examples, the experience 402 can be associated with one or more Web pages, yet aspects of the experience 402 can include, for example, one or more virtual reality (VR) three-dimensional scenes, one or more augmented reality (AR) three-dimensional scenes, and/or one or more mixed reality (MR) three-dimensional scenes. While the experience 402 shown in the example diagram 400 of FIG. 4 shows a limited number of spaces and scenes, it is understood in the context of this disclosure, that an experience can include any number of spaces (e.g., one, two, three, four, five, ten, twenty, one hundred) for related content and any number of scenes (e.g., one, two, three, four, five, ten, twenty, one hundred, etc.).

Figure 5:
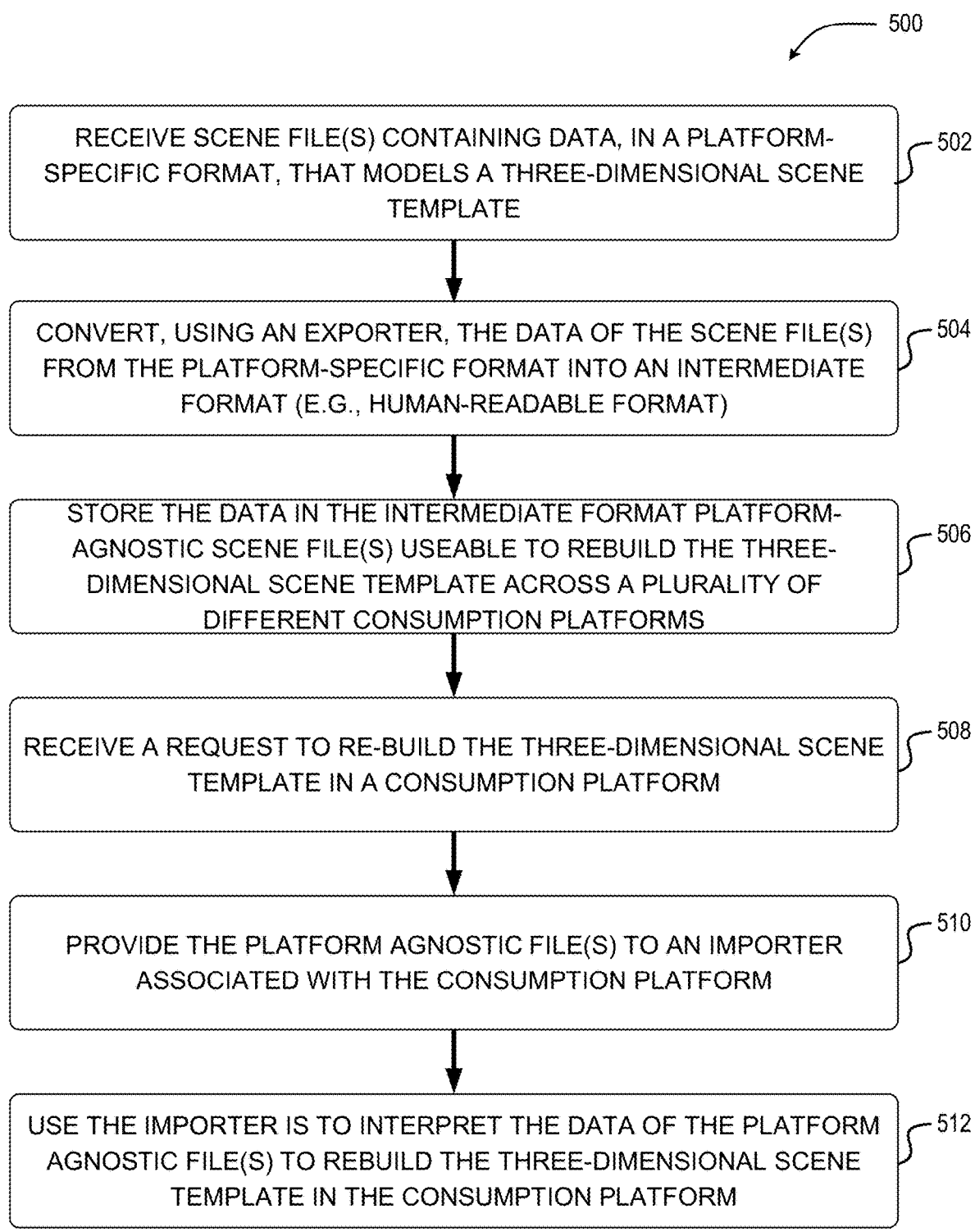
FIG. 5 is a diagram of an example flowchart that illustrates operations directed to converting platform-specific scene files into an intermediate format and storing data in the intermediate format as platform-agnostic scene files so they can be provided to various consumption platforms to rebuild a three-dimensional scene template.

FIG. 5 contains a flowchart of a method. It should be understood that the operations of the method disclosed herein are not presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, wearable computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

Additionally, the operations described herein can be implemented as a sequence of computer implemented acts or program modules running on a computing system (e.g., a computing device and/or devices of a network provider).

FIG. 5 is a diagram of an example flowchart 500 that illustrates operations directed to converting platform-specific scene files into an intermediate format and storing data in the intermediate format as platform-agnostic scene files so they can be provided to various consumption platforms to rebuild a three-dimensional scene template.

At operation 502, one or more scene files containing data, in a platform-specific format, that models a three-dimensional scene template is received.

At operation 504, the data of the scene file(s) is converted, using an exporter, from the platform-specific format into an intermediate format. As described above, the intermediate format comprises human-readable instructions (e.g. written descriptions of objects and object attributes).

At operation 506, the data in the intermediate format is stored as one or more platform-agnostic scene files useable to rebuild the three-dimensional scene template across a plurality of different consumption platforms.

At operation 508, a request to re-build the three-dimensional scene template in a consumption platform is received.

At operation 510, the platform agnostic file(s) are provided to an importer associated with the consumption platform.

At operation 512, the importer is used to interpret the data of the platform agnostic file(s), in the intermediate format, to rebuild the three-dimensional scene template in the consumption platform.

The disclosure presented herein may be considered in view of the following example clauses.

Example Clause A, a method comprising: receiving one or more scene files containing data, in a platform-specific format, that models a three-dimensional scene template, wherein the platform-specific format is associated with a design platform used to design the three-dimensional scene template; converting, by one or more processors and using an exporter, the data from the platform-specific format into an intermediate format, the intermediate format comprising human-readable instructions; storing the data in the intermediate format in one or more platform-agnostic scene files useable to rebuild the three-dimensional scene template across a plurality of consumption platforms; receiving a request to re-build the three-dimensional scene template in a consumption platform of the plurality of consumption platforms; providing the one or more platform-agnostic scene files to an importer associated with the consumption platform; and using the importer to interpret the human-readable instructions of the one or more platform-agnostic scene files to rebuild the three-dimensional scene template in the consumption platform.

Example Clause B, the method of Example Clause A, wherein: the three-dimensional scene template comprises a plurality of objects; each object of the plurality of objects is associated with attributes useable to rebuild the object; and the human-readable instructions provide written descriptions of the attributes useable to rebuild the object.

Example Clause C, the method of Example Clause B, wherein an individual attribute comprises a position of the object in the three-dimensional scene template.

Example Clause D, the method of Example Clause B, wherein an individual attribute comprises an orientation of the object in the three-dimensional scene template.

Example Clause E, the method of Example Clause B, wherein an individual attribute comprises a scale of the object in the three-dimensional scene template.

Example Clause F, the method of Example Clause B, wherein an individual attribute comprises a color of the object in the three-dimensional scene template.

Example Clause G, the method of Example Clause B, wherein an individual attribute comprises a shadowing of the object in the three-dimensional scene template.

Example Clause H, the method of Example Clause B, wherein an individual attribute comprises an enablement of user interaction with the object in the three-dimensional scene template.

Example Clause I, the method of any one of Example Clauses B through H, wherein a first section of a platform-agnostic scene file lists the plurality of objects included in the three-dimensional scene template and uniform resource locators that provide access to data used to render individual ones of the plurality of objects and a second section of the platform agnostic file defines settings for the attributes useable to rebuild an individual object in the three-dimensional scene template.

Example Clause J, the method of any one of Example Clauses B through I, wherein the intermediate format is extensible.

Example Clause K, a system comprising: at least one processor; and memory storing instructions that, when executed by the at least one processor, cause the system to perform operations comprising: receiving one or more scene files containing data, in a platform-specific format, that models a three-dimensional scene template, wherein the platform-specific format is associated with a design platform used to design the three-dimensional scene template; converting the data from the platform-specific format into an intermediate format, the intermediate format comprising human-readable instructions; storing the data in the intermediate format in one or more platform-agnostic scene files useable to rebuild the three-dimensional scene template across a plurality of consumption platforms; receiving a request to re-build the three-dimensional scene template in a consumption platform of the plurality of consumption platforms; and interpreting the human-readable instructions of the one or more platform-agnostic scene files to rebuild the three-dimensional scene template in the consumption platform.

Example Clause L, the system of Example Clause K, wherein: the three-dimensional scene template comprises a plurality of objects; each object of the plurality of objects is associated with attributes useable to rebuild the object; and the human-readable instructions provide written descriptions of the attributes useable to rebuild the object.

Example Clause M, the system of Example Clause L, wherein an individual attribute comprises a position of the object in the three-dimensional scene template, an orientation of the object in the three-dimensional scene template, a scale of the object in the three-dimensional scene template, a color of the object in the three-dimensional scene template, a shadowing of the object in the three-dimensional scene template, or an enablement of user interaction with the object in the three-dimensional scene template.

Example Clause N, the system of Example Clause L or Example Clause M, wherein a first section of a platform-agnostic scene file lists the plurality of objects included in the three-dimensional scene template and uniform resource locators that provide access to data used to render individual ones of the plurality of objects and a second section of the platform agnostic file defines settings for the attributes useable to rebuild an individual object in the three-dimensional scene template.

Example Clause O, the system of any one of Example Clauses L through N, wherein the intermediate format is extensible.

Example Clause P, one or more computer-readable storage media storing instructions that, when executed by at least one processor, cause a system to perform operations comprising: receiving one or more scene files containing data, in a platform-specific format, that models a three-dimensional scene template, wherein the platform-specific format is associated with a design platform used to design the three-dimensional scene template; converting the data from the platform-specific format into an intermediate format, the intermediate format comprising human-readable instructions; storing the data in the intermediate format in one or more platform-agnostic scene files useable to rebuild the three-dimensional scene template across a plurality of consumption platforms; receiving a request to re-build the three-dimensional scene template in a consumption platform of the plurality of consumption platforms; and interpreting the human-readable instructions of the one or more platform-agnostic scene files to rebuild the three-dimensional scene template in the consumption platform.

Example Clause Q, the one or more computer-readable storage media of Example Clause P, wherein: the three-dimensional scene template comprises a plurality of objects; each object of the plurality of objects is associated with attributes useable to rebuild the object; and the human-readable instructions provide written descriptions of the attributes useable to rebuild the object.

Example Clause R, the one or more computer-readable storage media of Example Clause Q, wherein an individual attribute comprises a position of the object in the three-dimensional scene template, an orientation of the object in the three-dimensional scene template, a scale of the object in the three-dimensional scene template, a color of the object in the three-dimensional scene template, a shadowing of the object in the three-dimensional scene template, or an enablement of user interaction with the object in the three-dimensional scene template.

Example Clause S, the one or more computer-readable storage media of Example Clause Q or Example Clause R, wherein a first section of a platform-agnostic scene file lists the plurality of objects included in the three-dimensional scene template and uniform resource locators that provide access to data used to render individual ones of the plurality of objects and a second section of the platform agnostic file defines settings for the attributes useable to rebuild an individual object in the three-dimensional scene template.

Example Clause T, the one or more computer-readable storage media of any one of Example Clauses P through S, wherein the intermediate format is extensible.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
receiving one or more scene files containing data, in a platform-specific format, that models a three-dimensional scene template, wherein:
the platform-specific format is associated with a design platform used to design the three-dimensional scene template; and
the three-dimensional scene template comprises a plurality of objects and attributes useable to rebuild the plurality of objects;
converting, by one or more processors and using an exporter, the data from the platform-specific format into an intermediate format, the intermediate format comprising human-readable instructions providing written descriptions of the attributes useable to rebuild the plurality of objects;
storing the data in the intermediate format in a platform-agnostic scene file useable to rebuild the three-dimensional scene template across a plurality of consumption platforms, wherein:
an individual consumption platform enables an authoring user to customize a three-dimensional scene for an experience;
an extensible first section of the platform-agnostic scene file declares content of the three-dimensional scene template by listing the plurality of objects and uniform resource locators that provide access to data used to render individual ones of the plurality of objects; and
an extensible second section of the platform agnostic file, that follows the extensible first section in a non-overlapping manner, defines settings for the attributes useable to rebuild the plurality of objects;
receiving a request to re-build the three-dimensional scene template in a consumption platform of the plurality of consumption platforms;
providing the platform-agnostic scene file to an importer associated with the consumption platform; and
using the importer to interpret the human-readable instructions of the platform-agnostic scene file to rebuild the three-dimensional scene template in the consumption platform, wherein the rebuilt three-dimensional scene template provides a starting point for the authoring user to customize the three-dimensional scene for the experience.

2. The method of claim 1, wherein an individual attribute comprises a position of an individual object in the three-dimensional scene template.

3. The method of claim 1, wherein an individual attribute comprises an orientation of an individual object in the three-dimensional scene template.

4. The method of claim 1, wherein an individual attribute comprises a scale of an individual object in the three-dimensional scene template.

5. The method of claim 1, wherein an individual attribute comprises a color of an individual object in the three-dimensional scene template.

6. The method of claim 1, wherein an individual attribute comprises a shadowing of an individual object in the three-dimensional scene template.

7. The method of claim 1, wherein an individual attribute comprises an enablement of user interaction with an individual object in the three-dimensional scene template.

8. A system comprising:
at least one processor; and
memory storing instructions that, when executed by the at least one processor, cause the system to perform operations comprising:
receiving one or more scene files containing data, in a platform-specific format, that models a three-dimensional scene template, wherein:
the platform-specific format is associated with a design platform used to design the three-dimensional scene template; and
the three-dimensional scene template comprises a plurality of objects and attributes useable to rebuild the plurality of objects;
converting the data from the platform-specific format into an intermediate format, the intermediate format comprising human-readable instructions providing written descriptions of the attributes useable to rebuild the plurality of objects;
storing the data in the intermediate format in a platform-agnostic scene file useable to rebuild the three-dimensional scene template across a plurality of consumption platforms, wherein:
an individual consumption platform enables an authoring user to customize a three-dimensional scene for an experience;
an extensible first section of the platform-agnostic scene file declares content of the three-dimensional scene template by listing the plurality of objects and uniform resource locators that provide access to data used to render individual ones of the plurality of objects; and
an extensible second section of the platform agnostic file, that follows the extensible first section in a non-overlapping manner, defines settings for the attributes useable to rebuild the plurality of objects;
receiving a request to re-build the three-dimensional scene template in a consumption platform of the plurality of consumption platforms; and
interpreting the human-readable instructions of the platform-agnostic scene file to rebuild the three-dimensional scene template in the consumption platform, wherein the rebuilt three-dimensional scene template provides a starting point for the authoring user to customize the three-dimensional scene for the experience.

9. The system of claim 8, wherein an individual attribute comprises a position of an individual object in the three-dimensional scene template, an orientation of the individual object in the three-dimensional scene template, a scale of the individual object in the three-dimensional scene template, a color of the individual object in the three-dimensional scene template, a shadowing of the individual object in the three-dimensional scene template, or an enablement of user interaction with the individual object in the three-dimensional scene template.

10. One or more computer-readable storage media storing instructions that, when executed by at least one processor, cause a system to perform operations comprising:
   receiving one or more scene files containing data, in a platform-specific format, that models a three-dimensional scene template, wherein:
      the platform-specific format is associated with a design platform used to design the three-dimensional scene template; and
      the three-dimensional scene template comprises a plurality of objects and attributes useable to rebuild the plurality of objects;
   converting the data from the platform-specific format into an intermediate format, the intermediate format comprising human-readable instructions providing written descriptions of the attributes useable to rebuild the plurality of objects;
   storing the data in the intermediate format in a platform-agnostic scene file useable to rebuild the three-dimensional scene template across a plurality of consumption platforms, wherein:
      an individual consumption platform enables an authoring user to customize a three-dimensional scene for an experience;
      an extensible first section of the platform-agnostic scene file declares content of the three-dimensional scene template by listing the plurality of objects and uniform resource locators that provide access to data used to render individual ones of the plurality of objects; and
      an extensible second section of the platform agnostic file, that follows the extensible first section in a non-overlapping manner, defines settings for the attributes useable to rebuild the plurality of objects;
   receiving a request to re-build the three-dimensional scene template in a consumption platform of the plurality of consumption platforms; and
   interpreting the human-readable instructions of the platform-agnostic scene file to rebuild the three-dimensional scene template in the consumption platform, wherein the rebuilt three-dimensional scene template provides a starting point for the authoring user to customize the three-dimensional scene for the experience.

11. The one or more computer-readable storage media of claim 10, wherein an individual attribute comprises a position of an individual object in the three-dimensional scene template, an orientation of the individual object in the three-dimensional scene template, a scale of the individual object in the three-dimensional scene template, a color of the individual object in the three-dimensional scene template, a shadowing of the individual object in the three-dimensional scene template, or an enablement of user interaction with the individual object in the three-dimensional scene template.

* * * * *